Patented June 19, 1928.

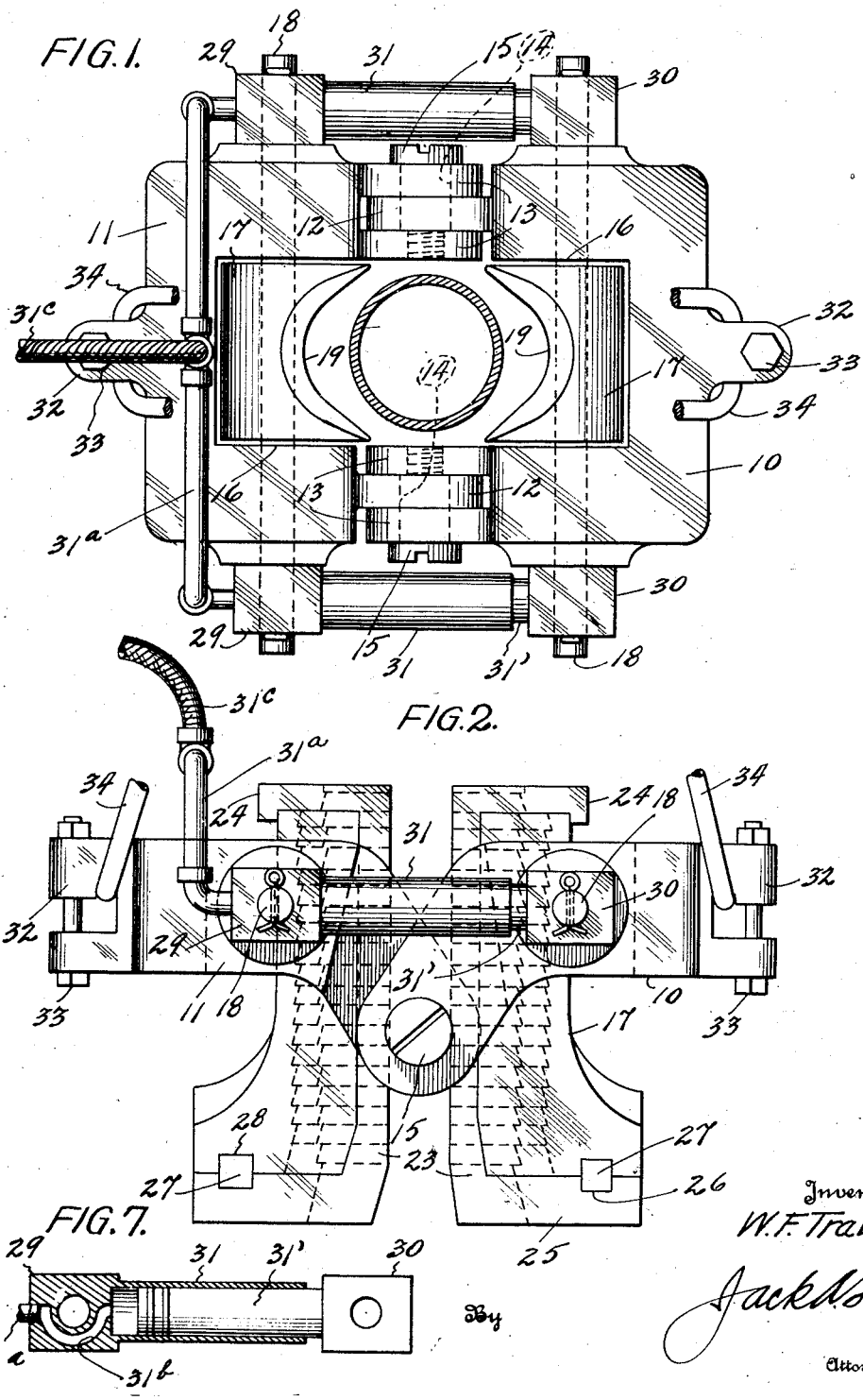

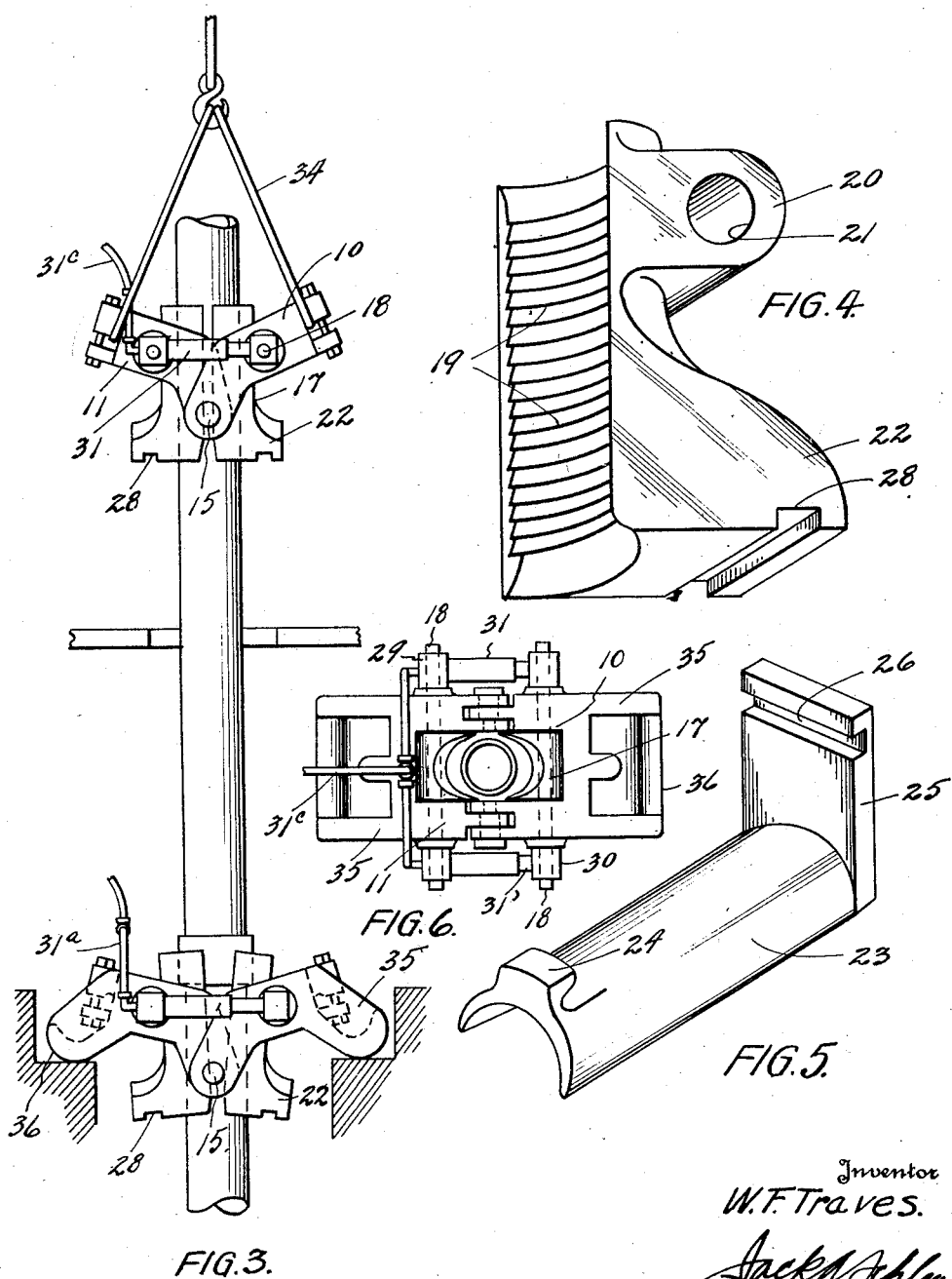

1,674,144

UNITED STATES PATENT OFFICE.

WEBSTER F. TRAVES, OF OKLAHOMA CITY, OKLAHOMA, ASSIGNOR TO THE GUIBERSON CORPORATION, OF DALLAS, TEXAS, A CORPORATION OF DELAWARE.

PIPE GRIPPING AND SUPPORTING DEVICE.

Application filed January 8, 1927. Serial No. 159,792.

This invention relates to new and useful improvements in pipe gripping and supporting devices.

The object of the invention is to provide a device of the character described in which the gripping members are so arranged as to free the pipe and collars as the pipe is pulled upward therethrough, but to automatically grip and support the pipe if the latter is dropped or moved downwardly while being lifted, and to equip said device with means for opening and closing the gripping members by means of a fluid under pressure.

Another object of the invention is to provide a device having fulcrumed supporting members equipped with opening and closing means controlled and operated from a remote point.

A particular object of the invention is that while the device may be fastened in an open position to permit the pipe and collars to be lowered therethrough, it can not be fastened in gripping position.

A still further object of the invention is to provide a device of the knuckle-joint type comprising simple parts with an easy opening means.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a plan view of an elevator constructed in accordance with my invention, Fig. 2 is a side elevation of the same, Fig. 3 is a view showing the elevator applied to a pipe and also showing in side elevation a spider constructed in accordance with the invention and gripping said pipe, Fig. 4 is a perspective view of one of the gripping members.

Fig. 5 is a perspective view of a liner used on the gripping member for smaller pipe, Fig. 6 is a plan view of the spider shown in Fig. 3, and Fig. 7 is a sectional detail of one of the fluid operators.

It is to be understood that my invention may be embodied either in an elevator, a spider or any other form of pipe gripping and supporting device for which it is suitable.

In constructing the elevator, I employ a pair of yokes 10 and 11 respectively. Each yoke has at one side a single lug 12 and at the other side a pair of spaced ears 13. The lugs and ears are arranged on opposite sides so that the lug of one yoke will enter between the ears of the other yoke at the transverse center of the device. The lugs are pivoted on shouldered pins 14, which are screwed into the inner ears and are provided with heads 15 whereby they may be removed.

The yokes, when pivoted together, constitute supporting elements connected by knuckle-joints. By observing Fig. 2, it will be seen that the ears and lugs are directed downwardly from the ends of the yoke and the pivot pins are thus below the plane of the yokes.

Each yoke has a U-shaped recess or socket 16 in which a gripping member 17 is pivoted on a transverse rod or shaft 18. Each gripping member comprises a toothed concaved face 19 for gripping the pipe and collars. A transverse boss 20 extends across the back of each gripping member near its upper end and is provided with a smooth longitudinal bore 21, through which the shaft 18 passes. The bore is offset from the face 19 and is considerably above the center of the member, therefore, in order to counterbalance the member and cause it to hang with its face 19 parallel to the pipe, an enlargement 22 is formed at the bottom of the member, as is best shown in Figs. 2 and 4. By this arrangement the gripping members will hang substantially perpendicular, irrespective of the position to which the yokes are swung.

Where it is desired to grip pipes of smaller diameters, a concavo-convex liner 23 is seated against the face 19 of each gripping member. Each liner has a hook 24 at its upper end (Fig. 5) for engaging over the reduced upper end of said member. A clamp plate 25 at the bottom of the liner extends under the flat bottom of the member and has an angular recess 26 for receiving a locking key 27 which engages in a similar recess 28 in the member 17. To remove the liners, it is merely necessary to drive out the keys and slip off said liners.

For swinging the yokes to open and close the device, I employ fluid pressure operators each comprising a head block 29 hinged on one end of one of the shafts, a foot block 30 hinged on one end of the other shaft 18, a cylinder 31 extending from the block 29 and receiving a piston 31' extending from the block 30. A manifold 31$^a$ is connected to the blocks 29 and passages 31$^b$ lead from the manifold connections to the cylinders. A flexible hose or pipe 31$^c$ supplies fluid under pressure to the said manifold.

When it is desired to open the device to spread the gripping members 17 apart, fluid is supplied from a suitable point through the hose 31$^c$ to the manifold 31$^a$ and passages 31$^b$ to the cylinders 31. The fluid will force the pistons 31' outwardly in the cylinders, which will spread the blocks 29 and 30 apart, the yokes 10 and 11 swinging on their fulcrums in vertical arcs. When pressure is released the yokes will swing down to a closed position. The controlling valve or other means (not shown) may be located at a point remote from the device so that the workman need not leave the derrick floor to operate the device.

Where the device is used as an elevator, I provide the outer central portion of each yoke with a hook 32 and a keeper bolt 33 for receiving and retaining the elevator links 34. Where the device is constructed as a spider, transverse fulcrum bosses 35 are formed on the outer ends of each yoke and extend outwardly and downwardly similarly to the lugs and ears. Each boss 35 has a rounded face 36 extending across its outer end and upon which the yoke is fulcrumed, as is shown in Fig. 3.

It will be seen that the action will be substantially the same whether the yokes are fulcrumed on the links 34 or on the bosses 35. When the parts are swung to the position shown in Fig. 3, the yokes are supported on their fulcrums and the gripping members 17 are free to grip the pipe. When the pipe is moved upwardly, the teeth 19 will not bite into the pipe, because owing to the knuckle-joints between the yokes and the fulcrumed supports both the gripping members and the yokes will move upwardly, thus offering no resistance to the upwardy moving pipe. In this connection, it is pointed out that the pipe collars will readily pass through the gripping members and owing to the pivoted mounting of said members, they will grip the collar and the pipe at the same time when the pipe is moved downwardly. It will be seen that should the pipe be dropped that the fulcrumed yokes and pivoted gripping members will be carried downwardly and toward each other by the pipe, thus automatically gripping the same.

The fulcrumed yokes and pivoted gripping members enable easy and quick handling of the device and permit the pulling of pipe under safe conditions, because the pipe will be automatically gripped if dropped, yet no resistance is offered to the pulling. Also where the spider is mounted in the collar the fluid pressure operators may be controlled from the derrick floor. The counter-balanced gripping members will always present the teeth of the faces 19 in maximum gripping relation to the pipe and will adjust themselves after a collar passes therebetween, or will grip said collar efficiently. By removing the pins 15, the yokes may be quickly separated and removed or applied to a pipe.

Various changes in the size and shape of the different parts, as well as modifications and alterations, may be made within the scope of the appended claims.

What I claim is:

1. In a pipe gripping and supporting device, a pair of jointed elements having supporting fulcrums upon which they are mounted, a pair of gripping members pivoted within said elements and having gripping faces, and fluid pressure operators connected with the jointed elements for swinging said elements.

2. In a pipe gripping and supporting device, a pair of jointed elements having supporting fulcrums upon which they are mounted, a pair of gripping members pivoted within said elements and having vertical gripping faces, and fluid pressure operators connected with the supporting elements for swinging the same on their fulcrums to spread the gripping members.

3. In a pipe gripping and supporting device, a pair of horizontally disposed supporting elements mounted to rock in vertical arcs and joined together, a pair of pipe gripping members pivotally suspended by said elements and having gripping faces for gripping a pipe and its collars, said members being mounted to yield to an upward movement of the pipe and to automatically grip the pipe upon a downward movement of the same, and fluid pressure operators connected with the supporting elements for swinging said elements.

4. In a pipe gripping and supporting device, a pair of horizontally disposed supporting elements mounted to rock in vertical arcs and joined together, a pair of pipe gripping members pivoted in said elements, and fluid pressure operators connected with the supporting elements for swinging said elements and arranged to be operated from a remote point.

5. In a pipe gripping and supporting device, a pair of horizontally disposed supporting elements mounted to rock in vertical arcs and joined together, a air of pipe gripping members pivoted in said elements, a pair of fluid pressure operators each comprising a cylinder connected to one supporting element and a piston telescoping into the cylinder and connected to the other supporting element.

6. In a pipe gripping and supporting device, a pair of jointed supports connected together for movement in vertical arcs, a pair of opposed gripping members mounted to swing in vertical arcs in said supports and having gripping faces, and fluid pressure operated means connected with the jointed supports for swinging said supports in vertical arcs.

In testimony whereof I affix my signature.

WEBESTER F. TRAVES.